United States Patent [19]

Beduchaud et al.

[11] 3,966,187
[45] June 29, 1976

[54] DEVICE FOR LOADING AND UNLOADING A SHEET ON A ROTATING DRUM

[75] Inventors: Michel Beduchaud, Palaiseau; Andre Ramadier, Paris, both of France

[73] Assignee: Compagnie Industrielle des Telecommunications Cit-Alcatel, Paris, France

[22] Filed: Jan. 2, 1975

[21] Appl. No.: 538,216

[30] Foreign Application Priority Data

Jan. 7, 1974 France ............................ 74.00457

[52] U.S. Cl. ................................ 271/3; 271/277; 271/DIG. 3; 271/DIG. 9; 346/138
[51] Int. Cl.² .................... B65H 5/04; B65H 5/12
[58] Field of Search ............... 271/277, 3, DIG. 9, 271/DIG. 3, 8 R, 82, 267, 268; 346/138, 132, 125; 360/136, 100

[56] References Cited
UNITED STATES PATENTS

| | | |
|---|---|---|
| 3,790,159 | 2/1974 | Hatzmann et al. ............... 271/277 X |
| 3,808,603 | 4/1974 | Degreve et al. ..................... 346/138 |
| 3,860,230 | 1/1975 | Georges .................................. 271/3 |

*Primary Examiner*—Evon C. Blunk
*Assistant Examiner*—Bruce H. Stoner, Jr.
*Attorney, Agent, or Firm*—Sughrue, Rothwell, Mion, Zinn & Macpeak

[57] ABSTRACT

The invention comes within the field of facsimile devices and concerns the winding and unwinding of a document on a rotating drum. According to the invention, the fixing of only one edge of the document on the drum is provided for and the unloading of the document is made easier by a drawer which applies resilient pressure tangentially against the cylindrical surface of the drum. The document is removed in a reverse direction in relation to the operation of the facsimile device.

7 Claims, 4 Drawing Figures

DEVICE FOR LOADING AND UNLOADING A SHEET ON A ROTATING DRUM

BACKGROUND OF THE INVENTION

1. Field of the Invention

The invention concerns a device for loading and unloading a sheet on a rotating drum comprising a means for stopping the drum in a determined angular position, a drawer which slides underneath the drum and which is linked mechanically, through a part of its motion, to the drum, a clamping bar which extends a generatrix of the drum and which is held by resilient means in a position called the "closed" position, enabling the gripping of an edge of the sheet and a stop which is fixed relative to the drum and which affects the clamping, opening it when the drawer is completely pulled out.

The invention therefore relates to installations in which it is necessary to feed a rotating drum with sheets of paper, films or the like, it being necessary to clamp these latter on the drum during the operation of the installation concerned. The invention has been more particularly designed for facsimile installations ensuring the reading of data and the writing of data on a document, at the transmission set and at the receiving set respectively.

2. Description of the Prior Art

The devices commonly used are manual; they require the feeding of the sheet by the operator into a clamp or the insertion of the sheet under one or two longitudinal bars which clamp it under the effect of return springs.

Semi-automatic devices which comprise a drawer on which the documents to be wound on are set in position are also known. At the time of the pushing in of the drawer, the documents are wound onto the drum by means of a system of cables and clamping bars which engage, by suitable means, on the surface of the drum. When the drawer is pulled out of the device, the system of cables and clamping bars is detached from the drum and is wound onto the surface of the drawer. Such a device is not very versatile, inasmuch as concerns different formats of sheets and documents and the winding and coupling system for the tape and cable system constitues, by its complexity, a source of faulty operation.

With a view to simplifying the mechanism, it would be useful to fix the sheet by only one edge on the drum and to ensure the holding of the sheet on the drum by pressure or guide elements. This solution, which is implemented by some manual loading and unloading devices, cannot be directly adapted to a semi-automatic loading in which a drawer is coupled mechanically to the drum, for the pulling out of the drawer would bring the drum in the reverse direction and would jam the free edge of the document against the first obstacle which it found. In a device in which the document is held by only one edge and in which an excessive moving away of the other edge from the drum is prevented by guide elements which are set round the drum at a slight distance, it seems indeed impossible to make the drum rotate in the reverse direction at the time of unloading.

SUMMARY OF THE INVENTION

The invention tends to overcome that difficulty. It concerns a loading and unloading device according to the preamble, which is characterized in that the drawer is provided, on a part of its upper surface, with resilient pressure means which, when the drawer is between the two end positions, in terms of its path of travel from full out to full in, are applied tangentially against the cylindrical surface of the drum but which no longer touch it when the drawer is completely pushed in.

In an embodiment of the invention which is a particular advantage, the resilient means comprise an upper layer of a substance having a high friction coefficient.

Preferably, the means for stopping the drum is arranged in such a way that in the determined angular position, the clamping bar is on the quarter of the cylindrical surface which is directed towards the operator. In that case, the free edge of the document which is pressed behind the clamping bar on the drum is placed above the drawer and is displayed to the operator when the latter opens the drawer. If the latter is completely pulled out, the drum has effected about three quarters of a turn and the clamping plate is placed at the lowest point of the drum.

To prevent the drum from having no guide elements over too great a distance, guide elements which, when the drum is completely pushed in mate a part of the surface of the drum at a slight distance, may be provided on the drawer, in front of the pressure means.

In a preferred embodiment of the invention, the mechanical coupling between the drum and the drawer is obtained by at least one rack bar fixed to the drawer, which co-operates with a toothed wheel fixed to the drum.

The invention will be described in greater detail hereinafter with reference to four figures.

Figure 1:
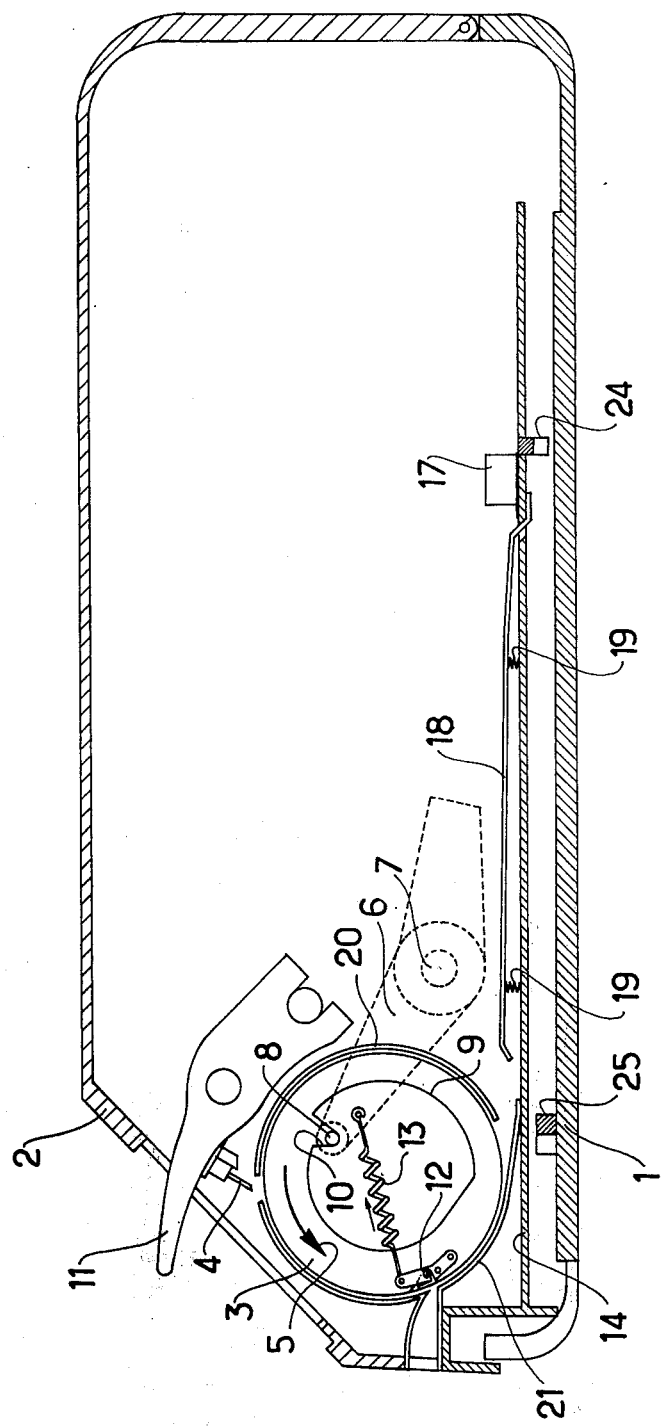
FIG. 1 is a diagrammatic cutaway view of a facsimile device comprising the device according to the invention.

On referring to FIG. 1, there is a facsimile device which comprises, on a stand 1 and under its cover 2 a drum 3 which is driven by a motor (not shown) and which rotates in front of a writing or reading head 4 in the direction shown by the arrow 5. All the electrical part and electronic part of the device has been omitted from the description for sake of clarity.

The loading and unloading device comprises firstly a means for stopping the drum in a predetermined position. That means is constituted by an arm 6 which is articulated about an axle 7 and which bears a roller 8 co-operating with a notch 10 on a cam 9. When the arm is lowered, the roller presses against the circumference of the cam 9 and finally falls into the notch, suddenly stopping the drum. At that instant, the feeding of the motor is stopped by appropriate means. The notch 10 has an asymmetrical shape enabling the roller 8 to leave the notch 10 when the drum rotates in the reverse direction, that is, in the opposite direction of the arrow 5.

The writing and reading head 4 is mounted on a carriage 11 whih moves that head during the operation of the device along the drum.

The drum bears, along a generating line, a clamping bar 12 whih is intended to grip one edge of a sheet of paper or a document, by means of a spring 13.

Figure 2:
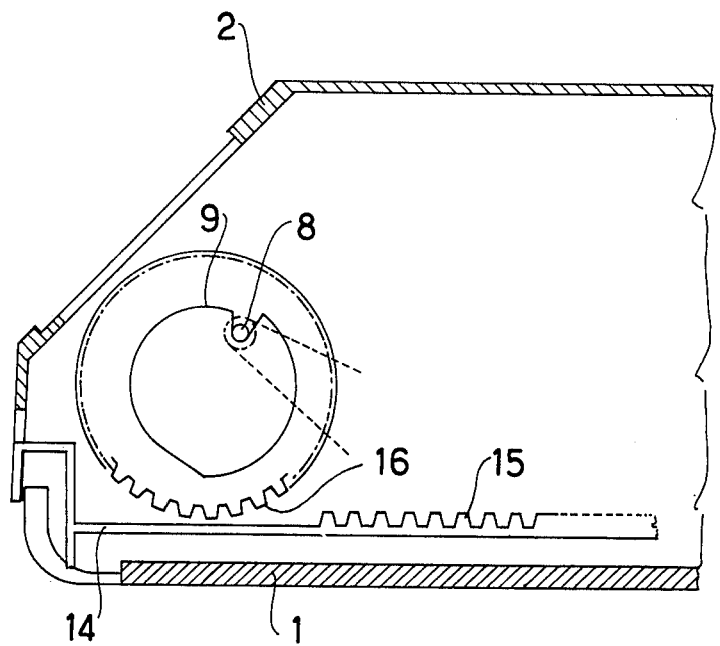
FIG. 2 is another cutaway view of that same device.

The device comprises, moreover, a drawer 14 which is shown in FIG. 1 in the pushed in position. As will be described further on, that drawer may slide, underneath the drum 3 and it is coupled to that drum by a rack 15 fixed to the drawer and by a toothed wheel 16 fixed to the drum. It will be observed in FIG. 2, which shows the device in the same state as in FIG. 1, that the rack takes up only a part of the length of the drawer so as to release the drum for rotation when the drawer is completely pushed in.

Figure 4:
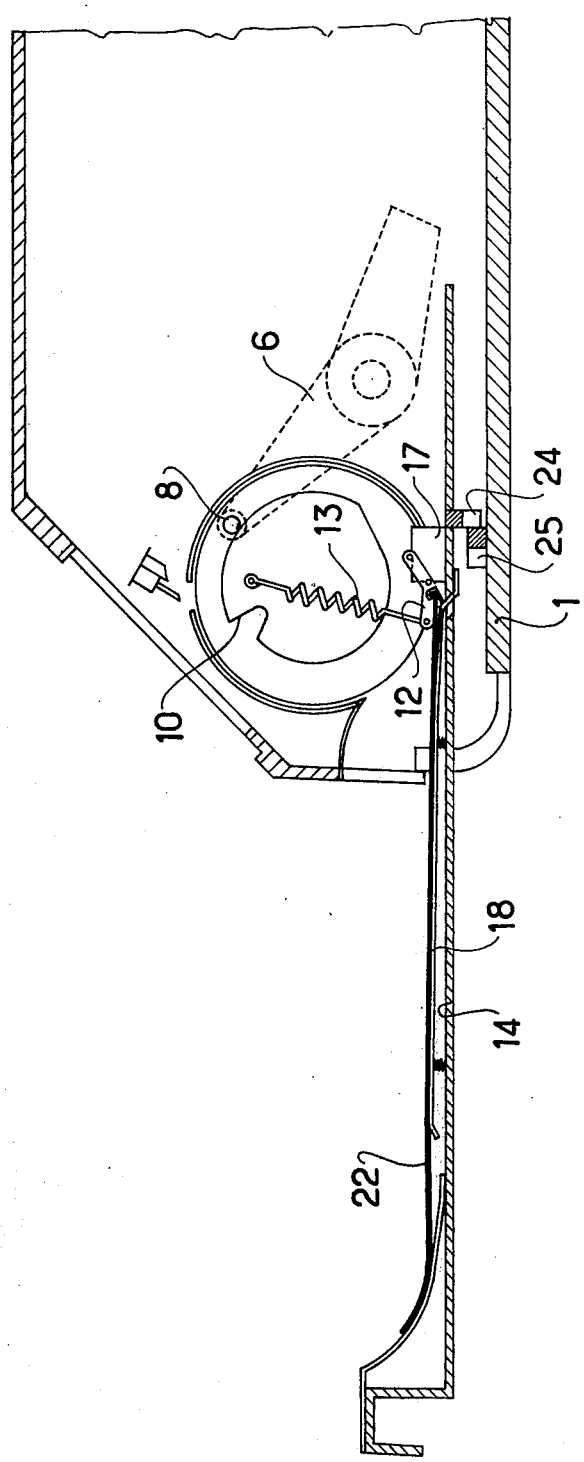

Almost at the bottom of that drawer, there is a stop 17 which is used for opening the clamping bar 12 when the drum is completely pulld out (FIG. 4). A magnet 24 or soft iron part which co-operates with another magnetic part 25 which is fixed on the stand, is mounted underneath the stop. The said parts adhere magnetically together when the drawer is completely pulled out and keep that state when the operator releases the drawer.

The drawer comprises, according to the invention, on its upper surface, a plate 18 borne on four springs 19. The plate constitutes a resilient pressure means during the loading and the unloading. The level of that plate is substantially tangential to the drum.

Lastly, guide elements 20 which mate the circumference of the drum at a slight distance over a great part of the circumference are shown. Only an upper slot enabling the applying of the writing and reading head 4 and a sector of about 100° below, necessary for the loading and the unloading are uncovered. Another guide element 21 which is fixed to the drawer mates the greater part of the said sector when that drawer is pushed in.

The operation of the device according to the invention will be described hereinafter. The state of FIG. 1 corresponds to the rest position of the device. The drum takes up an angular position determined by the co-operation of the roller 8 and of the notch 10. The clamping bar 12 is in the closed state. To load a document on the drum, the operator pulls out the drawer completely. By that movement, it drives the drum in the opposite direction to the arrow 5, releasing the roller 8 until the clamping bar 12 is in the lowest position. At that instant, the stop 17 engages with lateral projections of the clamping bar and unblocks the latter against the force of the spring 13. The two magnetic parts 24 and 25 keep the drawer in the pulled out end position. Then the operator inserts the document 22 and moves it forwards until the front edge of the document abuts against the bottom of the slot opened by the clamping bar 12.

When the drawer is closed against the force of the magnetic parts 24 and 25, the stop 17 releases the clamping plate which closes and grips the edge of the document. At the same time, the drum rotates in the direction of the arrow 5 and stops in the position according to FIG. 1 when the toothed wheel 16 is released at the end of the stroke of the rack 15. The roller 8 has reached, again, in that position, the notch 10 of the cam 9. The operator can therefore lower the writing and reading head to its operating position and start up the movement of the carriage 11 for transmitting or receiving. Meanwhile, the roller is released from the cam 9 by means which are not shown.

At the end of the facsimile transmission, the roller 8 is again brought closer to the cam 9 and engages in the notch 10, stopping the device in the position shown in FIG. 1.

The operator now begins the unloading by opening the drawer. The particular shape of the rack causes the first two or three centimeters of the stroke of the drawer to have no effect on the position of the drum, but already, at this stage, the guide element 21 moves away from the drum and releases the free edge of the document which, by its own rigidity, gets rid of the drum.

Figure 3:
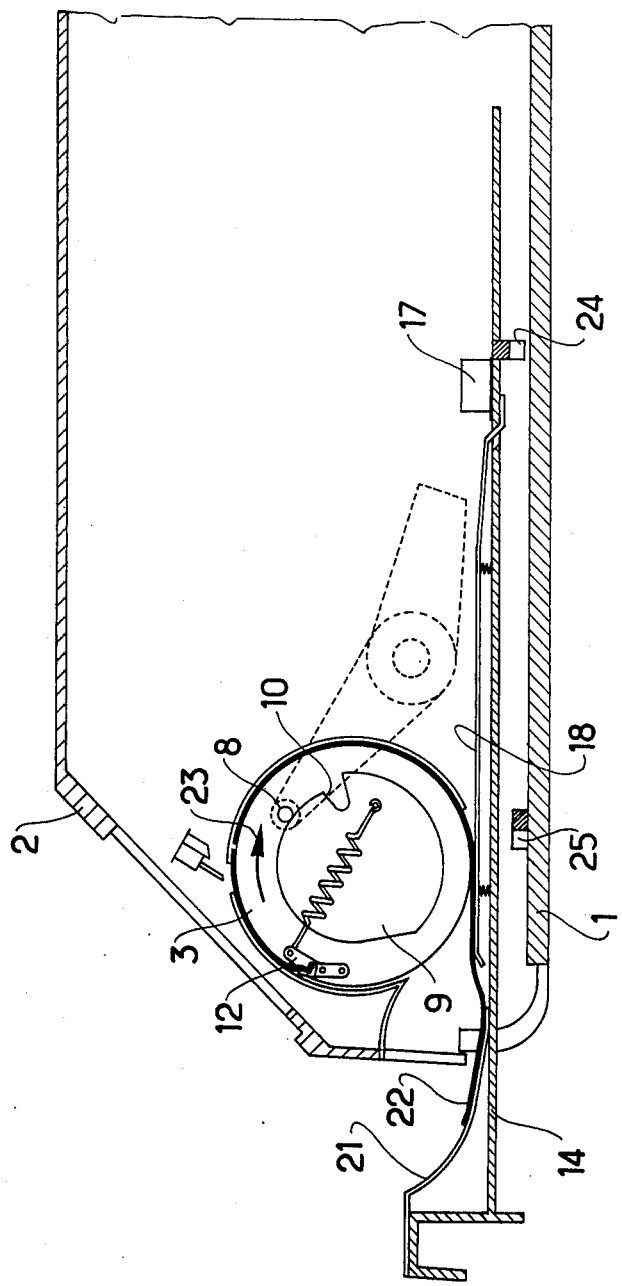
FIG. 3 and FIG. 4 show the same device in different states of operation.

As soon as the rack and the toothed wheel are coupled together, the drum begins to rotate in the direction of the arrow 23 in FIG. 3 and the roller 8 comes out of the notch 10. At the same time, the plate 18 has reached the bottom of the drum and presses against the latter. The movement of the drum and of the plate being synchronous, the document rests on the plate and comes out of the drawer towards the operator. FIG. 3 shows the state which is obtained shortly after the engaging of the toothed wheel on the rack, whereas FIG. 4 shows the drawer completely pulled out and the document on that drawer. The stop has opened the clamping bar and the operator can remove the document without difficulty.

The invention is not limited to the embodiment described hereinabove in detail. The plate 18 may be replaced by one or several flexible rails or by a mat having protruding studs. It is also possible to replace the rack by a friction drive or a cable drive and the invention may be applied to a device other than a facsimile device.

We claim:

1. A device for loading or unloading a sheet on a drum rotatably mounted on a stand, said device comprising:

means for stopping rotation of the drum in a predetermined angular position, a drawer, means for slidably mounting said drawer underneath the drum for movement between two end positions, in one of which the drawer is completely pulled out relative to the drum and in the other of which the drawer is completely pushed in, means for mechanically coupling said drawer to said drum, through a part of its sliding motion to effect rotation of said drum, a clamping bar extending along a generatrix of the drum, and resilient means for keeping said bar in a closed position, enabling the gripping of an edge of the sheet, and a stop fixed to the drawer and operatively associated with the clamping bar to open it when the drawer is commmpletely pulled out, the improvement comprising the drawer being provided on a part of its upper surface with resilient pressure means, which, when the drawer is between the two end positions of its sliding movement, presses tangentially against the cylindrical surface of the drum but which no longer touches said drum cylindrical surface when the drawer is completely pushed in.

2. The device according to claim 1, wherein: the resilient means has at least a top layer facing said drum of a substance having a high friction coefficient.

3. The device according to claim 1, wherein: the means for stopping the drum is such that in a predetermined angular position, the clamping bar is on the quarter of the drum cylindrical surface which is directed towards the operator.

4. The device according to claim 3, wherein: the mechanical coupling between the drum and the drawer is such that the clamping bar is placed at the lowest point of the drum when the drawer is completely pulled out.

5. The device according to claim 3, further comprising guide elements carried by said drawer, adjacent the pressure means, said guide elements being curved to match the partial circumference of the drum and located on said drawer such that when the drawer is completely pushed in, said guide elements are spaced a slight distance from the cylindrical surface of the drum.

6. The device according to claim 1, wherein: said mechanical coupling means between the drum and the drawer comprises at least one rack bar, fixed with the drawer in position to mesh with a toothed wheel fixed to the drum.

7. A device according to claim 1, wherein: two magnetic parts are fixed respectively on the drawer and the stand in such a way that they magnetically adhere together when the drawer is completely pulled out.

* * * * *